US008168078B2

(12) United States Patent
Sauerwein et al.

(10) Patent No.: US 8,168,078 B2
(45) Date of Patent: May 1, 2012

(54) ZINC-CONTAINING CALCIUM-ALUMINIUM DOUBLE SALTS

(75) Inventors: Reiner Sauerwein, Steinberg (DE); Alfred Reimer, Fuerth i. Wald (DE); Ludwig Edenharter, Burglengenfeld (DE); Manfred Sorgalla, Schwandorf (DE); Wolfgang Wehner, Alsbach-Haehnlein (DE)

(73) Assignee: Nabaltec AG, Schwandorf (DE)

( * ) Notice: Subject to any disclaimer, the term of this patent is extended or adjusted under 35 U.S.C. 154(b) by 0 days.

(21) Appl. No.: 12/470,118

(22) Filed: May 21, 2009

(65) Prior Publication Data

US 2009/0286915 A1 Nov. 19, 2009

Related U.S. Application Data

(63) Continuation of application No. PCT/EP2007/009877, filed on Nov. 15, 2007.

(30) Foreign Application Priority Data

Nov. 21, 2006 (DE) ........................ 10 2006 055 215

(51) Int. Cl.
*C08K 3/16* (2006.01)
*C01B 11/14* (2006.01)
*C01B 11/18* (2006.01)

(52) U.S. Cl. ......... 252/182.29; 252/182.32; 252/187.31; 252/182.33; 524/436; 524/402; 524/236; 524/417; 524/424; 23/304; 23/305 R; 23/305 A

(58) Field of Classification Search ................. 524/236, 524/417, 436, 402; 23/304, 305 R, 305 A; 252/182.29, 182.32, 187.31
See application file for complete search history.

(56) References Cited

U.S. PATENT DOCUMENTS 4,299,759 A 11/1981 Miyata et al.
4,675,356 A 6/1987 Miyata
5,670,568 A 9/1997 Plee et al.
5,972,245 A 10/1999 Schiller et al.
6,676,910 B1 1/2004 Rosenberg et al.
6,890,453 B2 * 5/2005 Fokken et al. ........... 252/182.29
2004/0140455 A1 7/2004 Fokken et al.
2006/0183830 A1 * 8/2006 Friedrich et al. .............. 524/236
2007/0100049 A1 * 5/2007 Ishizuka ...................... 524/417

FOREIGN PATENT DOCUMENTS

CN 1 526 640 9/2004
DE 41 06 403 A1 9/1992
DE 196 41 551 A1 4/1997
DE 195 26 370 C2 10/2001
DE 101 24 734 A1 12/2002
EP 0 189 899 A2 8/1986
EP 0742 782 B1 6/1998
EP 1 669 397 A1 6/2006
IE 920552 A1 9/1992
JP 3-237140 10/1991
WO WO 92/13914 A1 8/1992
WO WO 93/25612 A1 12/1993
WO WO 93/25613 A1 12/1993
WO WO 02/094919 A1 11/2002

OTHER PUBLICATIONS

Miyamoto et al., "Catalysis Today", Elsevier Science Publishers B.V. Amsterdam, vol. 10, pp. 201-121 (1991).
"Kunststoffhandbuch PVC" [Plastics Handbook, PVC], vol. 2/1, W. Becker/H. Braun, 2nd Edition 1985, Carl Hanser Verlag, pp. 538-541 & pp; and vol. 2/2, pp. 1006-1007.

* cited by examiner

*Primary Examiner* — James J Seidleck
*Assistant Examiner* — Deve E Valdez
(74) *Attorney, Agent, or Firm* — Muncy, Geissler, Olds & Lowe, PLLC

(57) ABSTRACT

Neutral calcium-aluminum double salts of the formula (A):

$$Ca_{2m}(Zn_{2n})Al_2(OH)_{6+2(2m+2n-1)}An^{*}oH_2O \quad (A),$$

where the following apply for m and n:m=0.5 to 3 and $0.5m \geqq n>0$; An=$CO_3$, where this may be replaced completely or partially by at least one of the following groups selected from OH, $ClO_4$ and $H_3CS(=O)_2O$ (triflate) and o=0 to 3. The present invention further relates to their preparation, use in compositions and stabilizer systems and uses thereof.

23 Claims, No Drawings

ZINC-CONTAINING CALCIUM-ALUMINIUM DOUBLE SALTS

This nonprovisional application is a continuation of International Application No. PCT/EP2007/009877, which was filed on Nov. 15, 2007, and which claims priority to German Patent Application No. DE 10 2006 055 215.6, which was filed in Germany on Nov. 21, 2006, and which are both herein incorporated by reference.

BACKGROUND OF THE INVENTION

1. Field of the Invention

The present invention relates to neutral zinc-containing calcium-aluminum double salts, their preparation, use in compositions and stabilizer systems and uses thereof.

2. Description of the Background Art

Novel lead-free PVC stabilizers require hydrotalcites or zeolites as stabilizer components for long-term stabilization in rigid PVC applications.

Known long-term stabilizer components are magnesium-aluminum hydroxocarbonates (U.S. Pat. No. 4,299,759), which are in most cases prepared from water-soluble precursors with the formation of salts as by-products according to the coprecipitation method (Catalysis Today 11(2), 201-212 (1991)). However, this method is not very advantageous since the amount of contaminants in the wastewater is increased due to the additional salt impurity.

U.S. Pat. No. 4,675,356 describes zinc-containing magnesium-aluminum hydroxocarbonates.

A PVC stabilizer based on hydrotalcite and calcium-aluminum hydroxide is publicized in DE-A 1 964 1551. Furthermore, DE-A 1 952 6370 discloses mixed alkaline earth metal-aluminum hydroxides as acid scavengers during the processing of thermoplasts. However, during the synthesis, the addition of sodium hydroxide or sodium aluminate to the reaction components has proven disadvantageous since in so doing molar amounts of NaOH have to be disposed of via the wastewater.

WO-A 92/13914 claims the use of calcium-aluminum hydroxides (hydrocalumites) as stabilizers for PVC. Carbonate-containing homologs, however, are not included here since, according to the description, the desired stabilizer effect cannot be achieved with these. The synthesis takes place according to the salt method (coprecipitation). This leads in turn to additional salt impurities in the wastewater.

WO-A 93/25613 names catoites as stabilizers for chlorine-containing olefin polymers. WO-A 93/25612 describes catoites with incorporated alkali metal ions as PVC stabilizers. A starting product is in turn sodium aluminate which, following the desired reaction, in turn releases molar amounts of NaOH, as a result of which the salt content in the wastewater is increased here too.

EP-A 0 742 782 describes basic magnesium-aluminum carbonates or calcium-aluminum hydroxides which additionally comprise the heavy metals titanium, zirconium and tin as 4-valent cations. These metals are incorporated by the corresponding tetrachlorides. However, working with these compounds in large reaction vessels charged with water and other reactants is complex since the tetrachlorides are extremely hydrolysis-sensitive and acid clouds are formed in air.

There is therefore a need for further salts which can be used in particular as stabilizers for synthetic polymers such as rigid or flexible PVC.

SUMMARY OF THE INVENTION

It is therefore an object of the present invention to provide such salts.

DETAILED DESCRIPTION

The object is achieved by a neutral calcium-aluminum double salt of the formula (A):

a. $Ca_{2m}(Zn_{2n})Al_2(OH)_{6+2(2m+2n-1)}An^{*}oH_2O$ (A), where the following applies for m and n: m=0.5 to 3 and $0.5m \geqq n > 0$; $An=CO_3$, where this may be replaced completely or partially by at least one of the following groups selected from OH, $ClO_4$ and $F_3CS(=O)_2O$(triflate) and o =0 to 3.

This is because it has been found that precisely these special double salts are particularly suitable as stabilizers and for further uses.

Within the context of the present invention, the term "neutral" in neutral calcium-aluminum double salts means that the double salt is "outwardly" electrically neutral. This means that the sum of the charges of the cations and anions, taking into consideration their fractions within the salt, are identical. An aqueous suspension of such neutral double salts has a basic reaction.

Preference is given to a double salt of the formula (A), in which $An=CO_3$. It is particularly preferred here that the following apply for m and n:m=1.25 to 3.0 and $0.25\ m \geqq n > 0$ and o=0 to 1.5.

Furthermore, preference is given to a double salt of the formula (A) in which $An=CO_3$, which is partially replaced by $ClO_4$ or OH.

Furthermore, preference is given to a double salt of the formula (A), in which An=carbonate, which is replaced completely by $ClO_4$ and OH.

It has been found that the double salts according to the invention can be prepared very simply in water by a three-component solid synthesis.

Starting from the raw materials calcium oxide or calcium hydroxide, zinc oxide or zinc hydroxide and aluminum hydroxide and if desired sodium (potassium) carbonate or bicarbonate or carbon dioxide, where sodium carbonate or potassium carbonate is preferred and the addition takes place particularly preferably in a second reaction step, it is possible to obtain the novel basic calcium-aluminum double salts of the formula (A), where An=carbonate and/or hydroxide, after heating for several hours with intensive stirring in aqueous phase following removal by filtration as white solids in virtually quantitative yield. The reaction takes place preferably without pressure at 25 to 98° C. or at elevated temperatures of up to 160° C. and pressures of up to 12 bar.

Calcium hydroxide can be used, inter alia, as slaked lime or in aqueous suspension as lime water or lime milk, aluminum hydroxide can be used, inter alia, as gibbsite, hydrargillite or bayerite, and zinc oxide can be used, inter alia, as zinc white.

Perchlorate or triflate salts are obtained by reacting compounds according to formula (A) with aqueous dilute perchloric acid or trifluoromethanesulfonic acid, in particular at room temperature. In an alternative synthesis, it is also possible to start from calcined (activated) compounds of the formula (A) where An=carbonate and/or hydroxide. Following activation, a charging via anion exchange with aqueous alkali metal perchlorate or triflate solutions takes place, during which, if desired, alkali metal (bi)carbonate is present.

The present invention therefore further provides a method of preparing double salts according to the invention, comprising the steps (a) reaction of CaO, or $Ca(OH)_2$, ZnO or $Zn(OH)_2$ and $Al(OH)_3$ in aqueous suspension and addition of $CO_2$ or alkali metal (bi)carbonate, where reaction takes place at temperatures of from 10 to 100° C. and (b1) if appropriate reaction of the product obtained in step (a) with perchloric acid or trifluoromethanesulfonic acid or (b2) if appropriate calcination of the product obtained in step (a) at temperatures of from 200 to 900° C., anion exchange with alkali metal perchlorate or triflate, if appropriate in the presence of alkali metal (bi)carbonate in water.

The present invention further provides a composition comprising a synthetic polymer and at least one double salt according to the invention, where the synthetic polymer is in particular polyvinyl chloride (PVC).

Moreover, the present invention further provides a stabilizer system for synthetic polymers, comprising at least one double salt according to the invention.

In addition, it has been found that double salts of the formula (A) which are prepared in particular by the method described above, impart very good stability to synthetic, in particular halogen-containing polymers, preferably PVC, in particular under thermal stress (processing).

The compounds of the formula (A) can moreover be used in other synthetic polymers such as HD (high density), LD (low density) and LLD polyethylene (PE), polypropylene (PP) or polybutylene (PB) and polyisobutylene (PIB). Here, they fulfill the function in particular as fillers or flame retardant/smoke reducer in an exceptional manner.

Furthermore, they can be used as catalysts in basically catalyzed reactions (e.g. Claisen condensations and epoxidations of nitriles and also transesterifications) and also in oxidation reactions according to Bayer-Villiger. In activated form, they can function as supports for other catalysts, such as, for example, for hydrogenations, redox reactions, Michael additions, epoxidation according to Weitz-Schaeffer and cyanethylations.

The activation can take place by calcination of the double salts (A) at temperatures of from 200 to 900° C., during which water or water and carbon dioxide is cleaved off.

Typical double salts can include the following:

$Ca_{3.75}Zn_{0.25}Al_2(OH)_{12}CO_3*oH_2O$;

$Ca_{3.5}Zn_{0.5}Al_2(OH)_{12}CO_3*oH_2O$;

$Ca_{3.25}Zn_{0.75}Al_2(OH)_{12}CO_3*oH_2O$;

$Ca_3ZnAl_2(OH)_{12}CO_3*oH_2O$;

$Ca_{2.75}Zn_{1.25}Al_2(OH)_{12}CO_3*oH_2O$;

$Ca_{2.5}Zn_{1.25}Al_2(OH)_{11.5}CO_3*oH_2O$;

$Ca_2ZnAl_2(OH)_{10}CO_3*oH_2O$;

$Ca_{3.75}Zn_{0.25}Al_2(OH)_{12}(OH)_2*oH_2O$;

$Ca_{3.5}Zn_{0.5}Al_2(OH)_{12}(OH)_2*oH_2O$;

$Ca_{3.25}Zn_{0.75}Al_2(OH)_{12}(OH)_2*oH_2O$;

$Ca_3ZnAl_2(OH)_{12}(OH)_2*oH_2O$;

$Ca_{2.75}Zn_{1.25}Al_2(OH)_{12}(OH)_2*oH_2O$;

$Ca_{2.5}Zn_{1.25}Al_2(OH)_{11.5}(OH)_2*oH_2O$;

$Ca_2ZnAl_2(OH)_{10}(OH)_2*oH_2O$;

$Ca_4Zn_{0.25}Al_2(OH)_{12.5}CO_3*oH_2O$;

$Ca_{3.75}Zn_{0.5}Al_2(OH)_{12.5}CO_3*oH_2O$;

$Ca_{3.5}Zn_{0.75}Al_2(OH)_{12.5}CO_3*oH_2O$;

$Ca_{3.25}ZnAl_2(OH)_{12.5}CO_3*oH_2O$;

$Ca_3Zn_{1.25}Al_2(OH)_{12.5}CO_3*oH_2O$;

$Ca_{2.25}ZnAl_2(OH)_{10.5}CO_3*oH_2O$;

$Ca_4Zn_{0.25}Al_2(OH)_{12.5}(OH)_2*oH_2O$;

$Ca_{3.75}Zn_{0.5}Al_2(OH)_{12.5}(OH)_2*oH_2O$;

$Ca_{3.5}Zn_{0.75}Al_2(OH)_{12.5}(OH)_2*oH_2O$;

$Ca_{3.25}ZnAl_2(OH)_{12.5}(OH)_2*oH_2O$;

$Ca_3Zn_{1.25}Al_2(OH)_{12.5}(OH)_2*oH_2O$;

$Ca_{2.25}ZnAl_2(OH)_{10.5}(OH)_2*oH_2O$;

$Ca_{4.25}Zn_{0.25}Al_2(OH)_{13}CO_3*oH_2O$;

$Ca_4Zn_{0.5}Al_2(OH)_{13}CO_3*oH_2O$;

$Ca_{3.75}Zn_{0.75}Al_2(OH)_{13}CO_3*oH_2O$;

$Ca_{3.5}ZnAl_2(OH)_{13}CO_3*oH_2O$;

$Ca_{3.25}Zn_{1.25}Al_2(OH)_{13}CO_3*oH_2O$;

$Ca_3Zn_{1.5}Al_2(OH)_{13}CO_3*oH_2O$;

$Ca_{2.75}Zn_{1.25}Al_2(OH)_{12}(ClO_4)_2*oH_2O$;

$Ca_{2.5}ZnAl_2(OH)_{11}CO_3*oH_2O$;

$Ca_{2.25}ZnAl_2(OH)_{10.5}(ClO_4)_2*oH_2O$;

$Ca_{4.25}Zn_{0.25}Al_2(OH)_{13}(OH)_2*oH_2O$;

$Ca_4Zn_{0.5}Al_2(OH)_{13}(OH)_2*oH_2O$;

$Ca_{3.75}Zn_{0.75}Al_2(OH)_{13}(OH)_2*oH_2O$;

$Ca_{3.5}ZnAl_2(OH)_{13}(OH)_2*oH_2O$;

$Ca_{3.25}Zn_{1.25}Al_2(OH)_{13}(OH)_2*oH_2O$;

$Ca_3Zn_{1.5}Al_2(OH)_{13}(OH)_2*oH_2O$;

$Ca_{2.75}Zn_{1.25}Al_2(OH)_{12}(ClO_4)_2*oH_2O$;

$Ca_{2.5}ZnAl_2(OH)_{11}(OH)_2*oH_2O$;

$Ca_{2.25}ZnAl_2(OH)_{10.5}ClO_4(OH)*oH_2O$;

$Ca_{4.5}Zn_{0.25}Al_2(OH)_{13.5}CO_3*oH_2O$;

$Ca_{4.25}Zn_{0.5}Al_2(OH)_{13.5}CO_3*oH_2O$;

$Ca_4Zn_{0.75}Al_2(OH)_{13.5}CO_3*oH_2O$;

$Ca_{3.75}ZnAl_2(OH)_{13.5}CO_3*oH_2O$;

$Ca_{3.5}Zn_{1.25}Al_2(OH)_{13.5}CO_3*oH_2O$;

$Ca_{3.25}Zn_{1.5}Al_2(OH)_{13.5}CO_3*oH_2O$;

$Ca_3Zn_{1.5}Al_2(OH)_{13}(ClO_4)_2*oH_2O$;

$Ca_{2.75}Zn_{1.5}Al_2(OH)_{11.5}CO_3*oH_2O$;

$Ca_{2.5}ZnAl_2(OH)_{11}(ClO_4)_2*oH_2O$;

$Ca_{4.5}Zn_{0.25}Al_2(OH)_{13.5}(OH)_2*oH_2O$;

$Ca_{4.25}Zn_{0.5}Al_2(OH)_{13.5}(OH)_2*oH_2O$;

$Ca_4Zn_{0.75}Al_2(OH)_{13.5}(OH)_2*oH_2O$;

$Ca_{3.75}ZnAl_2(OH)_{13.5}(OH)_2*oH_2O$;

$Ca_{3.5}Zn_{1.25}Al_2(OH)_{13.5}(OH)_2*oH_2O$;

$Ca_{3.25}Zn_{1.5}Al_2(OH)_{13.5}(OH)_2*oH_2O$;

$Ca_3ZnAl_2(OH)_{12}(OH)_2*oH_2O$;

$Ca_{2.75}ZnAl_2(OH)_{11.5}(OH)_2*oH_2O$;

$Ca_{2.5}Zn_{0.75}Al_2(OH)_{10.5}(OH)_2*oH_2O$;

$Ca_{4.75}Zn_{0.25}Al_2(OH)_{14}CO_3*oH_2O$;

$Ca_{4.5}Zn_{0.5}Al_2(OH)_{14}CO_3*oH_2O$;

$Ca_{4.25}Zn_{0.75}Al_2(OH)_{14}CO_3*oH_2O$;

$Ca_4ZnAl_2(OH)_{14}CO_3*oH_2O$;

$Ca_{3.75}Zn_{1.25}Al_2(OH)_{14}CO_3*oH_2O$;

$Ca_{3.5}Zn_{1.5}Al_2(OH)_{14}CO_3*oH_2O$;

$Ca_{3.25}Zn_{1.25}Al_2(OH)_{13}(ClO_4)_2*oH_2O$;

$Ca_3ZnAl_2(OH)_{12}(ClO_4)_2*oH_2O$;

$Ca_{2.75}Zn_{0.75}Al_2(OH)_{11}CO_3*oH_2O$;

$Ca_{2.5}Zn_{0.75}Al_2(OH)_{9.5}CO_3*oH_2O$;

$Ca_{4.75}Zn_{0.25}Al_2(OH)_{14}(OH)_2*oH_2O$;

$Ca_{4.5}Zn_{0.5}Al_2(OH)_{14}(OH)_2*oH_2O$;

$Ca_{4.25}Zn_{0.75}Al_2(OH)_{14}(OH)_2*oH_2O$;

$Ca_4ZnAl_2(OH)_{14}(OH)_2*oH_2O$;

$Ca_{3.75}Zn_{1.25}Al_2(OH)_{14}(OH)_2*oH_2O$;

$Ca_{3.5}Zn_{1.5}Al_2(OH)_{14}(OH)_2*oH_2O$;

$Ca_{3.25}Zn_{1.25}Al_2(OH)_{13}ClO_4(OH)_2*oH_2O$;

$Ca_3ZnAl_2(OH)_{12}(OH)_2*oH_2O$;

$Ca_{2.75}Zn_{0.75}Al(OH)_{11}(OH)_2*oH_2O$;

$Ca_{2.5}Zn_{0.75}Al_2(OH)_{10.5}(ClO_4)_2*oH_2O$;

$Ca_{3.5}Zn_{0.25}Al_2(OH)_{11.5}CO_3*oH_2O$;

$Ca_{3.25}Zn_{0.5}Al_2(OH)_{11.5}CO_3*oH_2O$;

$Ca_3Zn_{0.75}Al_2(OH)_{11.5}CO_3*oH_2O$;

$Ca_{2.75}ZnAl_2(OH)_{11.5}CO_3*oH_2O$;

$Ca_{2.5}Zn_{1.25}Al_2(OH)_{11.5}(ClO_4)_2*oH_2O$;

$Ca_{2.25}Zn_{0.75}Al_2(OH)_{10}CO_3*oH_2O$;

$Ca_2Zn_{0.75}Al_2(OH)_{9.5}CO_3*oH_2O$;

$Ca_{3.5}Zn_{0.25}Al_2(OH)_{11.5}(OH)_2*oH_2O$;

$Ca_{3.25}Zn_{0.5}Al_2(OH)_{11.5}(OH)_2*oH_2O$;

$Ca_3Zn_{0.75}Al_2(OH)_{11.5}(OH)_2*oH_2O$;

$Ca_{2.75}ZnAl_2(OH)_{11.5}(ClO_4)_2*oH_2O$;

$Ca_{2.5}Zn_{1.25}Al_2(OH)_{11.5}ClO_4(OH)*oH_2O$;

$Ca_{2.25}Zn_{0.75}Al_2(OH)_{10}(ClO_4)_2*oH_2O$;

$Ca_2Zn_{0.75}Al_2(OH)_{9.5}(OH)_2*oH_2O$;

$Ca_{3.25}Zn_{0.25}Al_2(OH)_{11}CO_3*oH_2O$;

$Ca_3Zn_{0.5}Al_2(OH)_{11}CO_3*oH_2O$;

$Ca_{2.75}Zn_{0.75}Al_2(OH)_{11}(ClO_4)_2*oH_2O$;

$Ca_{2.5}ZnAl_2(OH)_{11}ClO_4(OH)*oH_2O$;

$Ca_{2.25}Zn_{0.5}Al_2(OH)_{9.5}CO_3*oH_2O$;

$Ca_2Zn_{0.5}Al_2(OH)_9CO_3*oH_2O$;

$Ca_{1.75}Zn_{0.75}Al_2(OH)_9CO_3*oH_2O$;

$Ca_{3.25}Zn_{0.25}Al_2(OH)_{11}(OH)_2*oH_2O$;

$Ca_3Zn_{0.5}Al_2(OH)_{11}(OH)_2*oH_2O$;

$Ca_{2.75}Zn_{0.75}Al_2(OH)_{11}(OH)_2*oH_2O$;

$Ca_{2.5}ZnAl_2(OH)_{11}(CO_3)_{0.5}ClO_4*oH_2O$;

$Ca_{2.25}Zn_{0.5}Al_2(OH)_{9.5}(OH)_2*oH_2O$;

$Ca_2Zn_{0.5}Al_2(OH)_{11}(OH)_2*oH_2O$;

$Ca_{1.75}Zn_{0.75}Al_2(OH)_g(OH)_2*oH_2O$;

$Ca_3Zn_{0.25}Al_2(OH)_{10.5}CO_3*oH_2O$;

$Ca_{2.75}Zn_{0.5}Al_2(OH)_{10.5}CO_3*oH_2O$;

$Ca_{2.5}Zn_{0.75}Al_2(OH)_{10.5}CO_3*oH_2O$;

$Ca_{2.25}Zn_{0.25}Al_2(OH)_{10.5}CO_3*oH_2O$;

$Ca_2Zn_{0.25}Al_2(OH)_{8.5}CO_3*oH_2O$;

$Ca_{1.75}Zn_{0.5}Al_2(OH)_{8.5}CO_3*oH_2O$;

$Ca_3Zn_{0.25}Al_2(OH)_{8.5}(OH)_2*oH_2O$;

$Ca_{2.75}Zn_{0.5}Al_2(OH)_{10.5}(OH)_2*oH_2O$;

$Ca_{2.5}Zn_{0.75}Al_2(OH)_{10.5}ClO_4(OH)*oH_2O$;

$Ca_{2.25}ZnAl_2(OH)_{10.5}(CO_3)_{0.5}ClO_4*oH_2O$;

$Ca_2ZnAl_2(OH)_{10}(ClO_4)_2*oH_2O$;

$Ca_{1.75}Zn_{0.25}Al_2(OH)_8(OH)_2*oH_2O$;

$Ca_{2.75}Zn_{0.25}Al_2(OH)_{10}CO_3*oH_2O$;

$Ca_{2.5}Zn_{0.5}Al_2(OH)_{10}CO_3*oH_2O$;

$Ca_{2.25}Zn_{0.75}Al_2(OH)_{10}ClO_4(OH)*oH_2O$;

$Ca_2ZnAl_2(OH)_{10}ClO_4(OH)*oH_2O$;

$Ca_{1.75}Zn_{0.25}Al_2(OH)_8CO_3{*}oH_2O$;

$Ca_{1.5}Zn_{0.75}Al_2(OH)_{8.5}CO_3{*}oH_2O$;

$Ca_{2.75}Zn_{0.25}Al_2(OH)_{10}(OH)_2{*}oH_2O$;

$Ca_{2.5}Zn_{0.5}Al_2(OH)_{10}(OH)_2{*}oH_2O$;

$Ca_{2.25}Zn_{0.75}Al_2(OH)_{10}(OH)_2{*}oH_2O$;

$Ca_2ZnAl_2(OH)_{10}(CO_3)_{0.5}ClO_4{*}oH_2O$;

$Ca_{1.75}Zn_{0.25}Al_2(OH)_8(CO_3)_{0.5}ClO_4{*}oH_2O$;

$Ca_{1.5}Zn_{0.75}Al_2(OH)_{8.5}(OH)_2{*}oH_2O$;

$Ca_{3.75}Zn_{0.25}Al_2(OH)_{12}(CO_3)_{0.5}(OH){*}oH_2O$;

$Ca_{3.75}Zn_{0.25}Al_2(OH)_{12}(CO_3)_{0.25}(OH)_{1.5}{*}oH_2O$;

$Ca_{3.5}Zn_{0.5}Al_2(OH)_{12}(CO_3)_{0.5}(OH){*}oH_2O$;

$Ca_{3.5}Zn_{0.5}Al_2(OH)_{12}(CO_3)_{0.25}(OH)_{1.5}{*}oH_2O$;

$Ca_{3.75}Zn_{0.25}Al_2(OH)_{12}(CO_3)_{0.75}(ClO_4)_{0.5}{*}oH_2O$;

$Ca_{3.75}Zn_{0.25}Al_2(OH)_{12}(CO_3)_{0.5}ClO_4{*}oH_2O$;

$Ca_{3.5}Zn_{0.5}Al_2(OH)_{12}(CO_3)_{0.75}(ClO_4)_{0.5}{*}oH_2O$;

$Ca_{3.5}Zn_{0.5}Al_2(OH)_{12}(CO_3)_{0.5}ClO_4{*}oH_2O$;

$Ca_{3.75}Zn_{0.25}Al_2(OH)_{12}(ClO_4)_{0.5}(OH)_{1.5}{*}oH_2O$;

$Ca_{3.75}Zn_{0.25}Al_2(OH)_{12}ClO_4(OH){*}oH_2O$;

$Ca_{3.5}Zn_{0.5}Al_2(OH)_{12}(ClO_4)_{0.5}(OH)_{1.5}{*}oH_2O$;

$Ca_{3.5}Zn_{0.5}Al_2(OH)_{12}ClO_4(OH){*}oH_2O$;

The o here has the meaning stated above.

Preference is given to the compounds 1 to 7, 15 to 20, 27 to 35, 45 to 53, 61 to 72, 83 to 89, 97 to 103, 111 to 116, 123 to 128, 135 to 138 and 139 to 146. Very particular preference here is given to the compounds 1 to 4, 15 to 19, 27 to 32, 45 to 50, 63 to 68, 83 to 87, 97 to 101 and 143 to 146.

The double salts of the formula (A) can in particular be used as thermostabilizers for PVC in use amounts of from 0.1 to 10 phr. Preference is given to 0.5 to 5.0 phr, particular preference to 1.0 to 3.0 phr.

In stabilizer systems according to the invention and in particular for the thermostabilization of PVC, the following compounds and/or compound classes may additionally be present:

metal hydroxides or metal soaps (metal: Mg, Ca, Zn and Al)
hydrotalcites, Dawsonites and zeolites
beta-diketones or beta-ketoesters
aminouracils and -thiouracils
glycidyl compounds,
polyols (e.g. maltitol, lactitol, palatinitol, pentaerythritol, dipentaerythritol or THEIC)
phosphorous acid esters,
alkali metal, alkaline earth metal or zinc perchlorates (or triflates), also dissolved in water or an organic solvent (e.g. BDG (butyl diglycol), PEG (polyethylene glycol) or a polyol).

Further details relating to the compounds and compound classes (definitions and quantitative data) can be found in EP 1 669 397.

Furthermore, the following additives may optionally be added:

fillers
lubricants
plasticizers
pigments
epoxidized fatty acid esters
antioxidants
UV absorbers and photoprotective agents
propellants Detailed information in this regard can be found in EP 1 669 397 A1.

Additional additives are optical brighteners, antistats, biocides, processing aids, antifogging agents, gelling aids, impact modifiers, metal deactivators, flame retardants and smoke reducers and also compatibilizing agents. Descriptions in this respect can be found in "Kunststoffadditive [Plastics Additives]", R. Gächter, H. Müller, Carl Hanser Verlag, 3rd edition, 1989 and in "Handbook of Polyvinyl Chloride Formulating", E.J. Wickson, J. Wiley & Sons, 1993.

The present invention thus further provides a stabilizer system according to the present invention in which additionally at least one of the following substances is present:

an $Mt^{II}$(hydr)oxide(Mt=Mg, Ca, Zn) or aluminum hydroxide, an Mg, Ca, Al or Zn soap, a hydrotalcite, Dawsonite, zeolite or Ca—Al hydroxohydrogenphosphite, a glycidyl compound, an epoxidized fatty acid ester, a polyol (e.g. maltitol, lactitol, palatinitot, pentaerythritol, dipentaerythritol, TMP (trimethvlolpropane), bis-TMP (bis-trimethvlolpropane), or THEIC (tris-2-hydroxyethvlisocyanurate)), a phosphoric acid ester, 2-naphthol, an alkali metal, alkaline earth metal or zinc perchlorate (or triflate)—also dissolved in water or an organic solvent (e.g. BDG, PEG or a polyol)—, a costabilizer from the group of substituted cyanacetylureas, the substituted aminouracils, 3-aminocrotonic acid esters and/or dihydropyridinedicarboxylic acid esters, processing aids, lubricants, plasticizers, pigments, fillers, epoxidized fatty acid esters, antioxidants, UV absorbers, photostabilizers, impact modifiers, optical brighteners, antistats, biocides, flame retardants, propellants or antifogging agents.

The stabilizer systems according to the invention are suitable as stabilizers for synthetic polymers, in particular as PVC stabilizers, in particular for the stabilization of rigid PVC and flexible PVC.

Examples of the chlorine-containing polymers to be stabilized are polymers of vinyl chloride, vinylidene chloride, vinyl resins containing vinyl chloride units in their structure, such as copolymers of vinyl chloride and vinyl esters of aliphatic acids, in particular vinyl acetate, copolymers of vinyl chloride with esters of acrylic acid and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate and maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubber; chlorinated polymers of ethylene; polymers and postchlorinated polymers of chlorobutadiene and copolymers thereof with vinyl chloride, chlorinated natural and synthetic rubbers, and mixtures of said polymers with one another or with other polymerizable compounds. Within the context of this invention, PVC is also to be understood as meaning copolymers of vinyl chloride with polymerizable compounds such as acrylonitrile, vinyl acetate or ABS, which may be suspension polymers, bulk polymers or emulsion polymers.

Preference is given to a PVC homopolymer, also in combination with polyacrylates or polymethacrylates.

Furthermore suitable are also graft polymers of PVC with EVA (ethylene-vinyl acetate copolymer), ABS (acrylonitrile-butadiene-styrene copolymer) and MBS (methyl methacrylate-butadiene-styrene copolymer), likewise graft polymers of PVC with PMMA. Preferred substrates are also mixtures of the aforementioned homo- and copolymers, in particular vinyl chloride homopolymers, with other thermoplastic and/or elastomeric polymers, in particular blends with ABS, MBS, NBR (acrylonitrile-butadiene rubber), SAN (styrene-acrylonitrile copolymer), EVA (ethylene-vinyl acetate copolymer), CPE (chlorinated PE), PMA (polymethyl acrylate), PMMA (polymethyl methacrylate), EPDM (ethylene-propylene-diene elastomer) and polylactones, in particular from the group ABS, NBR, NAR, SAN and EVA. The abbreviations used for the copolymers are familiar to the person skilled in the art and are as follows: ABS acrylonitrile-butadiene-styrene; SAN styrene-acrylonitrile; NBR acrylonitrile-butadiene; NAR acrylonitrile-acrylate; EVA ethylene-vinyl acetate. Also suitable are in particular styrene-acrylonitrile copolymers based on acrylate (ASA). In this context, preferred components are polymer compositions which comprise, as components (i) and (ii), a mixture of 25-75% by weight of PVC and 75-25% by weight of the stated copolymers. Of particular importance as component are compositions of (i) 100 parts by weight of PVC and (ii) 0-300 parts by weight of ABS and/or ABS modified with SAN and 0-80 parts by weight of the copolymers NBR, NAR and/or EVA, but in particular EVA.

Also suitable for the stabilization within the context of this invention are furthermore in particular recyclates of chlorine-containing polymers, these being the polymers described in more detail above, which have experienced damage as a result of processing, use or storage. Particular preference is given to PVC recyclate. A further use of the stabilizer combinations according to the invention is based on the fact that antistatic properties can be imparted to the finished articles made of rigid or flexible PVC. In this way, it is possible to reduce the use of expensive antistats. Preference for this application is given to flexible PVC or semirigid PVC.

The invention further provides utensils (articles of use) which contain PVC and systems according to the invention.

Preference is also given to the use of articles of use which are characterized by a particularly fine foam structure. This is true for rigid PVC, flexible PVC and semirigid PVC. This aspect is particularly important for wall coverings and floorings made of flexible PVC.

The stabilization according to the invention is suitable both for chlorine-containing polymer compositions which are unplasticized or plasticizer-free or essentially plasticizer-free compositions, and also for plasticized compositions. Particular preference is given to applications in rigid PVC or semirigid PVC.

The compositions according to the invention are particularly suitable, in the form of rigid formulations, for hollow bodies (bottles), packaging films (deep-draw films), blown films, "crash pad" films (automobiles), pipes, foams, heavy-duty profiles (window frames), profiles for illuminated walls, building profiles, films (also produced by the Luvitherm method), profiles, sidings, fittings, office films and apparatus housings, insulators, computers and constituents of domestic appliances and also for electronic applications, in particular in the semiconductor sector. These are very particularly suitable for the manufacture of window profiles with high whiteness and surface shine.

Preferred other compositions in the form of semirigid and flexible formulations are suitable for wire sheathing, cable insulation, decorative films, roof films, foams, agricultural films, hoses, sealing profiles, floorings, wall coverings, motor vehicle parts, flexible films, injection moldings, office films and films for air-inflated structures. Examples of the use of the compositions according to the invention as plastisols are artificial leather, floorings, textile coatings, wall coverings, coil coatings and underfloor protection for vehicles, examples of sintered PVC applications of the compositions according to the invention are slush, slush mold and coil-coatings and also in E-PVC for films produced by the Luvitherm method. For more details on this see "KUNSTSTOFFHANDBUCH PVC [PLASTICS HANDBOOK PVC]", volume 2/2, W. Becker/H. Braun, 2nd edition, 1985, Carl Hanser Verlag, pp. 1236-1277.

The double salts according to the invention can also be used as adsorbates, where the double salts serve as solid carriers and alkali metal or alkaline earth metal perchlorates or triflates in liquid (dissolved) form are applied to these or sprayed onto these.

Adsorbates of sodium perchlorate or sodium triflate are accessible by spraying or stirring corresponding salt solutions onto/with activated or nonactivated compounds according to formula (A).

Moreover, preference is given to coated double salts according to the invention. The coating with stearic acid or palmitic acid is carried out at 50 to 80° C. This step takes place before a filtration, i.e. during the method or after a drying, i.e. after the actual preparation method, by adding the fatty acid. Preferably, this step is completed in a Henschel mixer.

The present invention further provides the use of the double salts according to the invention as additives for polyolefins, e.g. for PE, PP, PB and PIB or other synthetic polymers, in particular as flame retardants/smoke reducers or fillers or as catalyst (precursors) and for enzyme immobilization.

EXAMPLES

Example 1

Preparation of a Ca—Al Double Salt (Modification 1)

In a 2 l beaker, a mixture of 64.8 g (875 mMol) of $Ca(OH)_2$, 10.2 g (125 mMol) of ZnO, 42 g (500 mMol) of $Al(OH)_3$-wet and 26.5 g (250 mMol) of $Na_2CO_3$ in 1000 ml of $H_2O$ is ultraturraxed (10 000 rpm) for 2 hours at 90° C. The mixture is then left to cool to room temperature for a further 2 hours with vigorous stirring. After filtering off with suction and neutral washing, the product yield (drying: constant weight at 115° C.) is 112 g (white powder) with the composition $Ca_{3.3}(Zn_{0.5})Al_2(OH)_{10.8}(CO_3)_{1.4}.0.8H_2O$ (MW: 484.6 g)—quant. yield.

Elemental Analysis:

$CaO_{found}$ 34.2%; $ZnO_{found}$ 8.3%; $Al_2O_{3found}$ 21.3%; $CO_{2found}$ 13.0%; $H_2O_{found}$ 23.2%

$CaO_{calc.}$ 34.8; $ZnO_{calc.}$ 8.4%; $Al_2O_{3calc.}$ 21.0% $CO_{2calc.}$ 12.7%; $H_2O_{calc.}$ 23.0%

Example 2

Preparation of a Ca—Al Double Salt (Modification 2)

In a 2 l beaker, a mixture of 55.6 g (750 mMol) of $Ca(OH)_2$, 20.4 g (250 mMol) of ZnO, 42 g (500 mMol) of $Al(OH)_3$-wet and 26.5 g (250 mMol) of $Na_2CO_3$ in 1000 ml of $H_2O$ is ultraturraxed (10 000 rpm) for 2 hours at 90° C. The mixture is then left to cool to room temperature for a further 2 hours with vigorous stirring. Following filtration with suction and neutral washing, the product yield (drying: constant weight at 115° C.) is 114 g (white powder) with the composition $Ca_3(Zn)Al_2(OH)_{11.2}(CO_3)_{1.4}.0.6H_2O$ (MW: 510.0 g)—quant. yield.

Elemental Analysis:

$CaO_{found}$ 31.2%; $ZnO_{found}$ 15.8%; $Al_2O_{3found}$ 20.2%; $CO_{2found}$ 11.8%; $H_2O_{found}$ 22.0%

$CaO_{calc.}$ 30.1%; $ZnO_{calc.}$ 15.9%; $Al_2O_{3calc.}$ 20.0%; $CO_{2calc.}$ 12.1% $H_2O_{calc.}$ 21.9%

The products can if appropriate be coated with stearic acid or palmitic acid (0.5 to 5.0% by weight). This can take place in a mixer once reaction is finished, i.e. before the filtration or after the drying process.

Example 3

Applications-Related Testing of the Inventive Products of TS1, TS2 and Comparison with the Commercial Product TS3

The substance samples from example 1 and 2 (TS1 and TS2) are subjected to a dynamic heating test (DWT) at 195° C. compared to HYSAFE 549 (standard commercial hydrotalcite from J.M. HUBER Corp.)—TS3. The test is carried out on a COLLIN mill W110E (roll diameter: 110 mm, 10 rpm, friction: −10%).

At 5 minute intervals, test bodies (ca. 25×38 mm) are cut out of the rolled sheet (d=0.3 mm) and their yellowing (YI value) is determined using a color measuring instrument from BYK GARDNER (Spectro Guide Sphere Gloss) in accordance with ASTM D1925.

The test samples were composed as follows: (tab. 1)

TABLE 1

Composition of the test samples

| Components | TS 1 (parts) | TS 2 (parts) | TS 3 (parts) |
|---|---|---|---|
| PVC-1 (K value: 68)[1)] | 94 | 94 | 94 |
| PVC-2[2)] | 12 | 12 | 12 |
| Chalk (Omya 95T) | 6 | 6 | 6 |
| Titanium dioxide (Kronos 2220) | 4 | 4 | 4 |
| Lubricant-1 (Loxiol G60)[3)] | 0.5 | 0.5 | 0.5 |
| Lubricant-2 (Loxiol G22)[3)] | 0.1 | 0.1 | 0.1 |
| Ca/Zn stabilizer[4)] | 2.2 | 2.2 | 2.2 |
| Product - example 1 | 0.8 | — | — |
| Product - example 2 | — | 0.8 | — |
| HYSAFE 549 | — | — | 0.8 |

= Vinnolit S 3268, Vinnolit;

[2)]= Vinnolit K 707 E (copolymer of PVC and polyacrylate);

[3)]= COGNIS;

[4)]= Ca/Zn stabilizer composition without long-term component for external applications.

The samples are homogenized and then rolled. The YI values of the individual test bodies can be found in tab. 2 below.

TABLE 2

YI values of the test bodies (time intervals 5 min)

| Test sample | 5 min | 10 | 15 | 20 | 25 | 30 | 35 | 40 |
|---|---|---|---|---|---|---|---|---|
| TS 1 | 8.1 | 10.2 | 13.3 | 18.7 | 26.6 | 29.3 | 33.3 | 38.6 |
| TS 2 | 8.7 | 11.0 | 14.7 | 20.4 | 25.8 | 28.7 | 32.0 | 37.0 |
| TS 3 | 13.0 | 14.9 | 16.9 | 20.1 | 25.3 | 33.1 | 38.6 | 41.5 |

TS1 and TS2 are in accordance with the invention. TS3 corresponds to the closest prior art (PA). As can be seen, the performance (when using same weight) in the color retention (CR) is comparable with the PA. The starting color (SC), however, is considerably improved compared with the PA.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A neutral calcium-aluminum double salt of the formula (A):

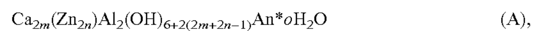

$$Ca_{2m}(Zn_{2n})Al_2(OH)_{6+2(2m+2n-1)}An^{*}oH_2O \quad (A),$$

where m=0.5 to 3 and 0.5m≧n>0; and An is at least one of the following groups selected from $CO_3$, OH, $ClO_4$ and $F_3CS(=O)_2O$ (triflate), and o=0 to 3.

2. The double salt as claimed in claim 1, wherein An=$CO_3$.

3. The double salt as claimed in claim 2, wherein m=1.25 to 3.0 and 0.25m≧n>0 and o=0 to 1.5.

4. The double salt as claimed in claim 1, wherein An is $CO_3$ and at least one of $ClO_4$ or OH.

5. The double salt as claimed in claim 1, wherein An is $ClO_4$ and OH.

6. A method of preparing double salts of the formula (A):

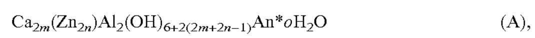

$$Ca_{2m}(Zn_{2n})Al_2(OH)_{6+2(2m+2n-1)}An^{*}oH_2O \quad (A),$$

where m=0.5 to 3 and 0.5m≧n>0; and An is at least one of the following groups selected from $CO_3$, OH, $ClO_4$ and $F_3CS(=O)_2O$ (triflate), and o=0 to 3, said method comprising the steps (a) reacting CaO or $Ca(OH)_2$, ZnO or $Zn(OH)_2$, and $Al(OH)_3$ in aqueous suspension and adding $CO_2$ or alkali metal (bi)carbonate, where the reaction takes place at temperatures of from 10 to 100° C. and (b1) optionally reacting the product obtained in step (a) with perchloric acid or trifluoromethanesulfonic acid or (b2) optionally calcining the product obtained in step (a) at temperatures of from 200 to 900° C., anion exchanging the calcined product with alkali metal perchlorate or triflate, optionally in the presence of alkali metal (bi) carbonate in water.

7. A composition comprising a synthetic polymer and at least one double salt as claimed in claim 1.

8. The composition as claimed in claim 7, wherein the synthetic polymer is polyvinyl chloride (PVC).

9. A stabilizer system for synthetic polymers, comprising at least one double salt as claimed in claim 1.

10. The stabilizer system as claimed in claim 9, wherein the double salt is present in an amount of from 0.1 to 10.0.

11. The stabilizer system as claimed in claim 9, wherein additionally at least one of the following substances is present: an $Mt^{II}$ (hydr)oxide where Mt is selected from the group consisting of Mg, Ca, and Zn, or aluminum hydroxide, an Mg, Ca, Al or Zn soap, a hydrotalcite, Dawsonite, zeolite or Ca—Al hydroxohydrogenphosphite, a glycidyl compound, an epoxidized fatty acid ester, a polyol, a phosphoric acid ester, 2-naphthol, an alkali metal, alkaline earth metal or zinc perchlorate or triflate optionally dissolved in water or an organic solvent, a costabilizer selected from the group consisting of cyanacetylureas, the substituted aminouracils, 3-aminocrotonic acid esters and/or dihydropyridinedicarboxylic acid esters, processing aids, lubricants, plasticizers, pigments, fillers, epoxidized fatty acid esters, antioxidants, UV absorbers, photostabilizers, impact modifiers, optical brighteners, antistats, biocides, flame retardants, propellants or antifogging agents.

12. The stabilizer system as claimed in claim 9, wherein the double salt is present in an amount of from 0.1 to 5.0 phr.

13. The stabilizer system as claimed in claim 9, wherein the double salt is present in an amount of from 0.5 to 2.0 phr.

14. The stabilizer system as claimed in claim 11, wherein said polyol is selected from the group consisting of maltitol, lactitol, palatinitol, pentaerythritol, dipentaerythritol, TMP (trimethvlolpropane), bis-TMP (bis- trimethvlolpropane), and THEIC (tris-2-hydroxyethylisocyanuratel).

15. The stabilizer system as claimed in claim 11, wherein said organic solvent is selected from the group consisting of BDG (butyl diglycol), PEG (polyethylene glycol), or polyol.

16. The method as claimed in claim 6, wherein An=$CO_3$.

17. The method as claimed in claim 16, wherein m=1.25 to 3.0 and 0.25m≧n>0 and o=0 to 1.5.

18. The method as claimed in claim 6, wherein An is $CO_3$ and at least one of $ClO_4$ or OH.

19. The method as claimed in claim 6, wherein An is $Cl0_4$ and OH.

20. The double salt as claimed in claim 1, wherein An is $CO_3$ and $F_3CS({=}O)_2O$ (triflate).

21. The double salt as claimed in claim 1, wherein An is $F_3CS({=}O)_2O$ (triflate).

22. The method as claimed in claim 6, wherein An is $CO_3$ and $F_3CS({=}O)_2O$ (triflate).

23. The method as claimed in claim 6, wherein An is $F_3CS({=}O)_2O$(triflate).

* * * * *